(No Model.)
J. T. CLARKSON.
SHIFTING SEAT CARRIAGE.
No. 497,765. Patented May 23, 1893.
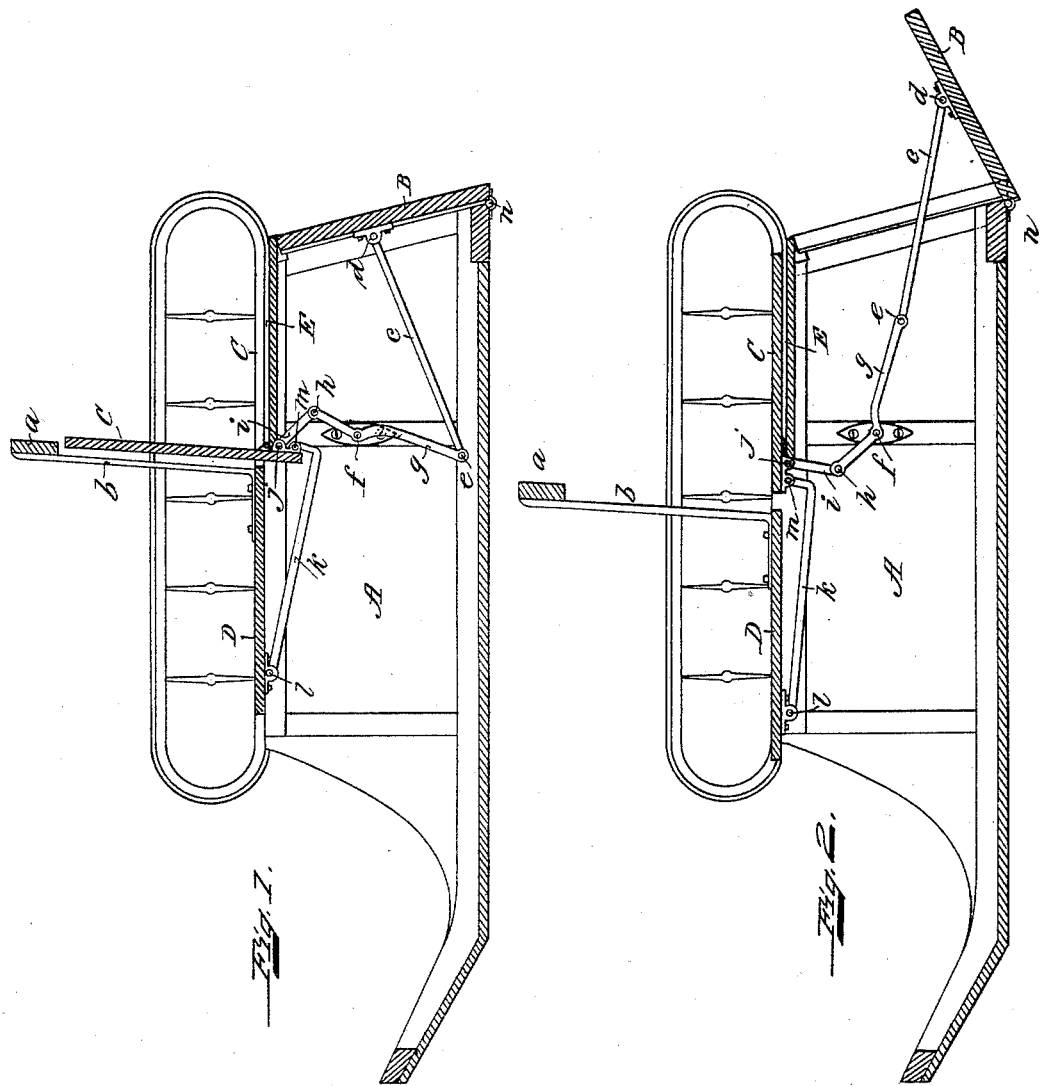
Witnesses.
H. K. Porter
L. W. Howe
Inventor.
Joseph T. Clarkson
per T. W. Porter Atty

UNITED STATES PATENT OFFICE.

JOSEPH T. CLARKSON, OF AMESBURY, MASSACHUSETTS.

SHIFTING-SEAT CARRIAGE.

SPECIFICATION forming part of Letters Patent No. 497,765, dated May 23, 1893.

Application filed February 17, 1893. Serial No. 462,673. (No model.)

*To all whom it may concern:*

Be it known that I, JOSEPH T. CLARKSON, of Amesbury, in the county of Essex and State of Massachusetts, have invented a new and useful Improvement in Carriages, which will, in connection with the accompanying drawings, be hereinafter fully described, and specifically defined in the appended claims.

In said drawings, Figure 1, is a longitudinal vertical section through the body and seats of the vehicle, which is shown as arranged for use as with the front seat only. Fig. 2, is a view like Fig. 1, except that both seats are arranged for use, so that the carriage is then a two-seated one; the tail board being opened out to serve as a foot board for those occupying the rear seat.

This invention relates to carriages adapted for use with either one or two seats; the rear seat being arranged to be turned down to a horizontal position when used as a rear seat and to be turned up to supplement the lazy back of the front seat when that is the sole seat of the carriage, the front seat being arranged to be automatically moved forward when two seats are employed, and to be moved back to the middle of the body when it serves as the sole seat of the vehicle.

The invention consists in certain improvements in the means and manner of arranging the respective devices by which the movement of the tail board serves to actuate the rear and front seats.

Referring again to said drawings, A represents the body side, which may be of any desired style adapted to my invention. The tail board is shown at B, and the rear seat at C, the front seat at D. The front seat is provided with a lazy back $a$ supported by irons $b$, substantially as shown. The tail board is hinged to the body at $n$, while at $d$ it has pivoted to it the rod $c$ which at $e$ is jointed to iron $g$ which is pivoted at $f$ to the body side and at $h$ it is pivoted to link $i$ which at $j$ is pivotally connected with the rear seat. A link $k$ is at its rear end pivoted to said rear seat at $m$ near its front edge, and at its front end to the front seat near its front edge at $l$. And these irons are duplicated at the two sides of the carriage body. It will be clear that by opening out the tail board, as shown in Fig. 2, the front seat will be moved to the front and the rear seat will be turned down upon the deck panel E (which is a fixed part of the carriage) to serve as the rear seat, while when the tail board is closed, as in Fig. 1, the front seat is moved rearward, to serve as the sole seat, and to balance the carriage when thus loaded, and the rear seat C is turned up under the front seat lazy back to supplement the same, as there shown.

I claim as my invention—

1. The combination of hinged tail board B, deck panel E, rigidly secured to the body, and the rear seat C connected by suitable irons with the tail board whereby the rising and falling of the latter will raise and lower the rear seat, substantially as specified.

2. In combination with the movable front seat the rising and falling rear seat and a tail board constructed to be opened and closed, the iron $c$ pivoted to the tail board iron $g$ pivoted upon the body and to iron $c$, link $i$ pivoted to iron $g$ and to rear seat C, and link $k$ connecting the front and rear seats together so that the movement of the latter is communicated to the former, substantially as specified.

3. The combination of a movable front seat and a hinged tail board, a deck panel and a rear seat hinged to said deck panel so as to be turned up beneath the lazy back of the front seat, substantially as specified.

JOSEPH T. CLARKSON.

Witnesses:
WILLIAM T. CLARKSON,
HERBERT W. MOSES.